Dec. 25, 1962  R. E. RISLEY  3,070,130
PIPE LINE REPAIR WITH RESILIENT BELLOWS SLEEVE
Filed Oct. 30, 1958
FIG. 1.
FIG. 1A.
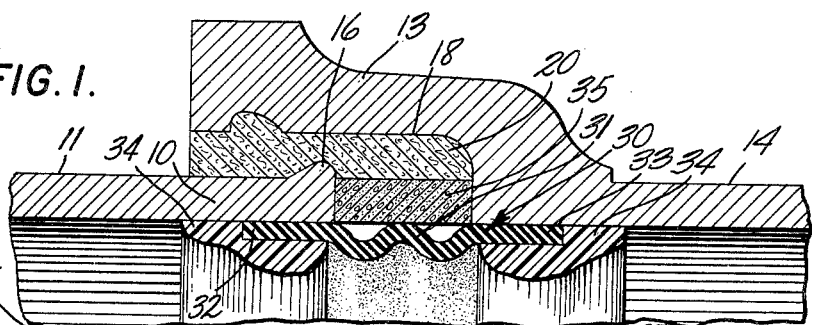
FIG. 2.
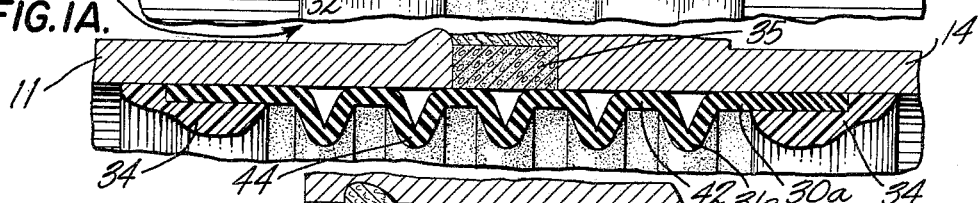
FIG. 3.
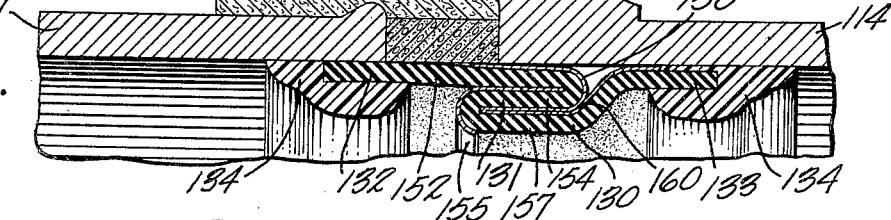
FIG. 4.

United States Patent Office 3,070,130
Patented Dec. 25, 1962

3,070,130
PIPE LINE REPAIR WITH RESILIENT
BELLOWS SLEEVE
Roger E. Risley, Bradford, Pa., assignor to Dresser Industries, Inc., Dallas, Tex., a corporation of Delaware
Filed Oct. 30, 1958, Ser. No. 770,766
6 Claims. (Cl. 138—97)

This invention relates to the repair of pipe lines, especially pipe joints, and is more particularly concerned with a pipe joint sealing construction adapted primarily for use with large-diameter pipe of the bell and spigot type for sealing the joint between the sections of pipe, more specifically for repairing a joint which has developed a leak due to failure of the packing and caulking means originally employed in the joint.

In the installation of pipe lines for the transmission of water and other fluids, particularly so-called large diameter pipe lines wherein the pipe sections have a diameter of, for example, at least 24 inches outside diameter and including diameters of six feet and more, it is common practice to use pipe of the so-called bell and spigot type, the spigot end of one section of pipe being received in the bell end of the adjacent section. In connecting the pipe sections in laying the pipe line, a resilient packing or other caulking material is commonly packed between the internal periphery of the bell end and against the outer surface of the spigot end to provide a fluid-tight seal for the joint. In many instances, however, particularly in pipe lines carrying fluids under pressure, such caulking material in itself does not provide a permanent fluid-tight seal and has a tendency to be displaced by the pressure of the fluid flowing through the line. Furthermore, many pipe lines are subjected in normal service to movements of the soil and to thermal changes which tend to cause substantial relative movements between adjacent sections of pipe. Such movements tend to dislodge conventional packings and lead to leakage at the joint.

It is, therefore, frequently necessary to place a pipe clamp or coupling around the joint at some time subsequent to the laying of the pipe line in order to compensate for the displacement of the caulking material. One type of pipe clamp used on this type of pipe line joint comprises an annular gasket member which encircles the spigot end of the pipe section and engages the face of the bell end of the adjacent pipe section, and clamping means for holding the gasket in fluid-tight sealing position. The pipe clamping means commonly employed comprises a follower ring, which presses upon the gasket, an anchor ring which fits over the bell end of the pipe and is constructed to engage the bell to prevent withdrawal over the bell, and a plurality of bolts which extend between the follower ring and the anchor ring and when tightened serve to draw the follower ring toward the anchor ring to compress the gasket into sealing contact with the end face of the bell and the adjacent peripheral surface of the spigot.

Since commercial pipe of any standard size generally varies from what may be termed the nominal external diameter, some pipe being slightly under-sized and some pipe being slightly over-sized, it is necessary for the pipe clamp used for the above-mentioned purpose to be adjustable to fit pipe of varying outside diameters, i.e. to accommodate both over-sized and under-sized pipe of the nominal pipe size for which the clamp or coupling was made. Particularly important is the adjustment of the follower ring so that this ring will fit closely around the spigot and avoid an excessive annular space between the inner periphery of the ring and the exterior surface of the spigot through which the gasket material would tend to be extruded upon application of sealing pressure by tightening the bolts to draw the follower ring toward the anchor ring. For this purpose it has been proposed to form the follower ring from a plurality of arcuate sections which are adjustably interconnected to form the complete ring. Suitable adjustment of the follower ring, however, raises numerous practical problems. When the bolts connecting the follower ring with the anchor ring are drawn up they tend to move the follower ring axially of the pipe to apply pressure to the gasket and the gasket tends to resist such movement. It will thus be seen that careful application of the clamp or coupling is required if fully effective results are to be obtained and such careful application requires considerable working room around the exterior of the pipe joint. However, in the laying of pipe lines of the character indicated above, i.e. by interconnection of bell and spigot pipe sections, it is often necessary to run the lines through tunnels or other conduits for relatively long distances. In such instances there is generally not sufficient room exteriorly of the pipe line to permit application of the conventional type of clamp or coupling and a major problem arises. This problem has not been adequately solved by construction heretofore available in the art.

It is an object of the present invention to provide pipe repair means particularly suitable for a pipe joint between adjoining pipe sections which may be fully installed without requiring access to the exterior of the pipe.

It is another object of the invention to provide a pipe joint repair construction of the character indicated which is fully effective notwithstanding the normal relative movements of the pipe sections in service.

It is a further object of the invention to provide a pipe repair construction which may be easily and rapidly applied wholly from the interior of the pipe line.

It is another object of the invention to provide a method of repairing a leaking pipe line which simplifies pipe repair in areas in which access to the exterior of the pipe line is not feasible.

In accordance with the invention, there is provided a pipe line repair construction particularly adapted to repairing a leaking pipe joint which comprises a resilient sleeve having folds or pleats intermediate its ends, with the sleeve being secured at its ends to the interior walls of the pipe sections adjacent the joint to be repaired and the folds of the sleeve underlying, at least in part, the gap between the pipe sections. In one embodiment of the invention, means are provided for preventing binding of the folds to each other and to reinforce the folds so that free movement of the folds during relative movement of the pipe sections is always permitted, and another embodiment of the invention includes a sleeve construction which has integrally formed folds which are resistant to binding connection with one another.

It is a feature of the invention that the sleeve may be applied to the interior of the pipe rapidly and efficiently without requiring specially skilled labor normally required in the application of exterior pipe repair constructions.

It is a further feature of the invention that the pipe repair construction provides a fully effective seal against further leakage during all normal relative movements of the pipe in service.

Other objects and features of the invention will be readily apparent from the following detailed description of illustrative embodiments of pipe repair constructions and methods of pipe repair, taken in combination with the accompanying drawing wherein, FIG. 1 is a fragmentary sectional view of a bell and spigot joint provided with a flexible internal seal embodying features of the present invention;

FIG. 1A is a similar view of a bell and spigot joint with a modified form of flexible seal;

FIG. 2 shows in cross section another bell and spigot pipe joint having a flexible internal seal in accordance with the present invention which is provided with reinforcement and separating means;

FIG. 3 is a similar view showing a further modified reinforced flexible internal seal; and FIG. 4 shows another form of the reinforced flexible seal as used in a bell and spigot pipe joint having a gap between the opposed surfaces of the pipes.

Referring to the drawing, and more particularly to FIG. 1, there is shown a bell and spigot pipe joint formed by the spigot end 10 of a pipe 11 and the bell end 13 of a pipe 14. The pipes 11 and 14 are of conventional construction and the bell 13 has a larger internal diameter than the greatest external diameter of the spigot end 10, the spigot end 10 being formed with an end enlargement 16 and the bell 13 being formed with a circular recess 18. The annular space lying between the spigot end 10 and the bell 13 is filled, as in conventional practice, with lead, rope, or other caulking material or a combination of these materials indicated at 20. The particular material 20 forms no part of the present invention and is shown in the drawings merely to illustrate the manner of conventionally sealing bell and spigot pipes. Leakage through caulking material 20 gives rise to the problem of re-establishing fluid-tight connection between the two pipe sections which is effectively solved by the flexible internal seal of the present invention.

In FIG. 1, this seal is shown at 25 and comprises a flexible elastic sleeve 30 which is corrugated in the nature of a bellows between its ends, as indicated at 31, to permit free limited longitudinal movement between the pipe sections without disturbing the seal. The sleeve 30 is formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined. Advantageously sleeve 30 is formed from a rubbery composition which is relatively resistant to attack by hydrocarbon gases and oils. Examples of such resistant rubber compositions suitable for use in the coupling of the invention are butadiene-acrylonitrile copolymers, such as those known commercially by the trade designations Buna-N or GR-A. The sleeve, however, is not limited to these specific materials of construction, and particularly when special resistance to hydrocarbon gases and oils is not required, any rubbery composition having the above-noted characteristics may be employed. The sleeve may have any convenient thickness but generally a thickness of ⅛ to ¼ in., e.g. 3/16 in., is suitable.

The ends 32 and 33 of the sleeve 30 are secured to the respective interior surfaces of spigot end 10 and bell end 13 by means of an adhesive which can be applied in the liquid or plastic state and will solidify to provide an effective bond which will not be disturbed by the flow of fluid through the pipe or by shocks or by vibrations in service. Any adhesive having these characteristics may be used and thus the sealing composition which is shown at 34 in FIG. 1 may be any settable composition known to the art which is plastic and putty-like when fresh but which sets or cures to a firm, adherent form. Well-known examples of this type of composition are described, for example in Allen U.S. Patent 1,261,750 and in Johnson U.S. Patent 981,429. My invention, however, is in no way limited to a specific settable composition and any of the many known settable compositions of this type may be employed. A particularly suitable composition which is preferably employed in accordance with this invention is the sealing composition formed from epoxy resin and filler which is sold commercially under the trade-name "Episeal" by Bonded Products, Inc., of Chicago, Illinois.

Epoxy resin adhesives are well-known compositions of matter and their composition and characteristics are described, for example, in "Epoxy Resins, Their Application and Technology," by Henry Lee and Kris Neville (McGraw-Hill Company, Inc. 1957) particularly in chapter 9 beginning at page 213. Suitable epoxy resin adhesives are described, for example, in U.S. Patents Nos. 2,528,417, of October 31, 1950, and 2,500,449. It is preferred to use the so-called two-container type wherein the curing agent is incorporated with the epoxy resin component just before application. Any of the well-known epoxy resin catalysts or curing agents may be employed such as those described in chapters 2, 3, 4 and 5 of the above-mentioned "Epoxy Resins, Their Application and Technology," by Henry Lee and Kris Neville. Suitable catalysts, for example, are poly-functional amines, such as ethylene diamine, ethylene triamine, diethylene triamine, benzyl dimethylamine, 3 - dimethylaminopropylamine, 3 - diethylaminopropylamine, tetraethylene pentamine and the like. These curing agents are conveniently employed in the amount of 5 to 20 parts per part by weight of the total composition.

The construction shown in FIG. 1 further advantageously includes a filling of plaster, e.g. plaster of Paris, or like material 35 which is used to fill the annular space between the pipe ends so that the interior of the pipe joint has a substantially continuous smooth surface. In effecting the joint repair as shown in FIG. 1, the sleeve 30 is placed in position with its ends 32 and 33 overlying the adjacent portions of the pipes 11 and 14 and the adhesive 34 is then applied over the sleeve ends and over the adjoining pipe wall to embed completely the sleeve ends and to leave the accordion pleated central portion of the sleeve overlying the plaster filling and bridging the gap between the resulting rings of adhesive 34. The above-described seal is readily installed from the interior of the pipe and involves no particular skilled labors or equipment or special techniques. It can be rapidly installed and provides a fluid-tight long-lasting seal for the joint notwithstanding complete deterioration of the original caulking material 20. Pipe lines of the type described above are normally provided with manholes at regular intervals along their length so that no problem of access to the interior of the lines is presented.

It will be understood that the particular shape of the repair sleeve may be varied as long as it provides for at least limited axial expansion and contraction. It is desired, however, that the sleeve should retain its pleated form and its cylindrical configuration under normal conditions and that it return to pleated form after having been expanded by outward axial movement of the pipes. In FIG. 1A is shown a modified form of sleeve which is designated generally by the reference numeral 30a. As will be seen, the sleeve 30a has a plurality of corrugations 31a which are separated by annular spacing portions 42 which have a substantial axial width with the corrugations forming relatively sharply inclined V-shaped sections 44. In this way there is maximum surface contact between the external surface of the sleeve and the internal walls of the pipe sections. The sleeve 30a is suitably installed in the manner described above in connection with the construction of FIG. 1.

It is also possible to provide a sleeve in a form which will permit the desired axial movement but which involve the use of overlapping pleats or folds rather than those in the nature of corrugations as in FIGS. 1 and 1A. Referring to FIG. 2, for example, wherein parts corresponding to those shown in FIG. 1 and in FIG. 1A have been given like reference numerals to which 100 has been added, pipe sections 111 and 114 are internally sealed by a flexible sleeve 130, the ends 132 and 133 of which are embedded in sealing composition 134. The sleeve 130, however, instead of being corrugated is formed with reverse folds 131 at its center so that there are three thicknesses of sleeve material when the sleeve is in its normal position as shown in FIG. 2. In order to prevent adhesion between the folds of the sleeve, which might occur after prolonged used, particularly if elevated temperatures are involved, there are provided slip rings which permit relative sliding movement between the folds and at the same time reinforce the sleeve structure. Thus, as shown in FIG. 2, a slip ring 150 of U-shaped cross-section overlies the outer and middle folds 152 and 154 of the sleeve, a second ring 155 of J-cross-section extends between the outer and middle folds and overlies the juncture between the inner and middle folds 157 and 154, and a third ring 160 overlies the radially outer surface of the inner fold 157. These three rings are suitably formed from a relatively thick paper, such as heavy kraft paper or they may be formed from thin metal such as steel of a thickness of, for example, .010 in., and advantageously have sufficient form stability that they will not be permanently deformed upon expansion of the joint and opening of the folds of the sleeve.

In installing the repair construction of FIG. 2, the procedure described above in connection with FIG. 1 is generally followed except that the adhesion-preventing elements or rings 150, 155 and 160 are suitably inserted and the sleeve 130 folded before the adhesive 134 is applied. The anti-adhesion characteristics of elements 150, 155 and 160 may be further improved, if desired, by coating the elements with wax or grease, any conventional wax such as carnauba wax and any conventional grease such as any conventional sodium-lithium soap grease being suitable for this purpose.

In a further embodiment of the invention shown in FIG. 3, wherein parts corresponding to those shown in FIGS. 1 and 1A have been given like reference numerals to which 200 has been added, the adhesion-preventing elements of FIG. 2 are replaced by coatings 250 and 255 of a wax or grease as described above. The sealing construction of FIG. 3 is installed in the same general manner as that described in connection with FIG. 2, with the wax or grease being applied to the sleeve 232 and the sleeve being folded before the adhesive 234 is employed.

In a further modified form as shown in FIG. 4, wherein parts corresponding to those shown in FIGS. 1 and 1A have been given like reference numerals to which 300 has been added, the flexible sleeve is separated from the pipe walls at the joint by a relatively rigid bridging member 365 and the plaster filler 35 of FIG. 1 has been eliminated. Thus, in the construction of FIG. 4, the pleated sleeve 332 has its ends sealed by adhesive 334 and has its folds separted by two J-shaped elements or rings 350 and 355 and a third element 360 corresponding respectively with elements 150, 155 and 160 of FIG. 2. The bridging member 365 is generally formed from a metal of a thickness sufficient to impart rigidity to the member, e.g. a thickness of .015 in., so that it is relatively rigid and free to slide without deformation across the pipe surfaces during relative movement of the pipe sections. It will be understood that this form of the invention is particularly adapted for installations in which relative deflection between the pipe sections is not encountered and wherein the pipe sections are relatively accurately aligned. In installing the construction of FIG. 4, the bridging member 365 is first placed in position across the gap between the pipe sections and the sleeve with its adhesion-preventing elements then secured as in the manner described in connection with the construction of FIG. 2.

While illustrative embodiments of the construction and of the joint repair method of this invention have been described above and illustrated in the drawing, it will be apparent to those skilled in the art that various changes and modifications may be made without departing from the scope of the invention as defined in the appended claims. Thus, while the invention has been described in connection with bell and spigot pipe joints, it may also be employed in connection with joints between tubular pipe sections which are exteriorly joined by a coupling construction of conventional form, and the pipe repair construction of this invention may also be applied to an intermediate point of a pipe section to repair a leak caused by cracking or puncturing of the pipe wall. Similarly, while the invention is applicable to pipe sections formed from metal, such as the pipe sections illustrated in the drawing, it is also fully applicable to pipe sections formed from concrete. In the case of structures such as those shown in FIGS. 2 and 4 wherein adhesion-preventing elements are interleaved with the folds of the sleeve, the cross-sectional shape of the elements may be varied and these elements need not be continuous rings but may have free ends either in abutting or overlapping relationship. It will be understood, therefore, that it is intended that all matter contained in the foregoing description and in the drawing shall be interpreted as illustrative only and not as limitative of the invention.

What I claim and desire to secure by Letters Patent is:

1. In a pipe line formed from pipe sections defining a joint forming a leakage area permitting escape of fluid from interiorly of the line, a repair construction isolating said leakage area from the fluid flowing through said pipe line, said repair construction comprising a flexible annular sleeve having a plurality of superposed pleats intermediate its ends and overlying said leakage area with said ends extending beyond the leakage area and a ring of adhesive enclosing each end and securing said ends to the walls of the adjacent pipe sections adjacent said leakage area, and adhesion-preventing means disposed between said superposed pleats, whereby said sleeve is adapted to undergo axial expansion and contraction upon relative movement of said pipe sections.

2. In a pipe line formed from pipe sections defining a joint forming a leakage area permitting escape of fluid from interiorly of the line, a repair construction isolating said leakage area from the fluid flowing through said pipe line, said repair construction comprising a flexible annular sleeve having a plurality of superposed pleats intermediate its ends and overlying said leakage area with said ends extending beyond the leakage area and a ring of adhesive enclosing each end and securing said ends to the walls of the adjacent pipe sections adjacent said leakage area, and adhesion-preventing means disposed between said superposed pleats, whereby said sleeve is adapted to undergo axial expansion and contraction upon relative movement of said pipe sections, and a rigid bridging element extending across the gap between the pipe sections and separating said gap from said sleeve.

3. In a pipe line having rigid pipe sections defining a joint normally effective to provide a fluid-tight connection between said pipe sections but said joint having a leakage area permitting escape of fluid from interiorly of the line, said pipe sections defining bores of substantially equal diameter on each side of said joint, a repair construction isolating said leakage area in said joint from the fluid flowing through said pipe line and through said bores of said rigid pipe sections, said repair construction comprising a unitary integral flexible annular sleeve formed from rubber composition and having a maximum diameter substantially the same as the diameter of said bores and having at least one pleat intermediate its ends and overlying said leakage area with said ends extending beyond the leakage area, and a ring of adhesive enclosing each end and securing said ends to the walls of said bores of substantially equal diameter of said adjacent rigid pipe sections adjacent said leakage area, whereby said sleeve is adapted to undergo axial expansion and contraction upon relative movement of said pipe sections.

4. In a pipe line having rigid pipe sections defining a joint normally effective to provide a fluid-tight connection between said pipe sections but said joint having a leakage area permitting escape of fluid from interiorly of the line, said pipe sections defining bores of substantially equal diameter on each side of said joint, a repair construction isolating said leakage area in said joint from the fluid flowing through said pipe line and through said bores of said rigid pipe sections, said repair construction comprising a flexible annular sleeve formed from a rubber composition and having a maximum diameter substantially the same as the diameter of said bores and having a plurality of superposed pleats intermediate its ends and overlying said leakage area with said ends extending beyond the leakage area and a ring of adhesive enclosing each end and securing said ends to the walls of said bores of substantially equal diameter of said adjacent rigid pipe sections adjacent said leakage area, whereby said sleeve is adapted to undergo axial expansion and contraction upon relative movement of said pipe sections.

5. In a pipe line having rigid pipe sections defining a joint normally effective to provide a fluid-tight connection between said pipe sections but said joint having a leakage area permitting escape of fluid from interiorly of the line, said pipe sections defining bores of substantially equal diameter on each side of said joint, a repair construction isolating said leakage area in said joint from the fluid flowing through said pipe line and through said bores of said rigid pipe sections, said repair construction comprising a unitary integral flexible annular sleeve formed from a rubber composition and having a plurality of corrugations intermediate its ends and overlying said leakage area with said ends extending beyond the leakage area and a ring of adhesive enclosing each end and securing said ends to the walls of said bores of substantially equal diameter of said adjacent rigid pipe sections adjacent said leakage area, whereby said sleeve is adapted to undergo axial expansion and contraction upon relative movement of said pipe sections.

6. In a pipe line having rigid pipe sections defining a joint normally effective to provide a fluid-tight connection between said pipe sections but said joint having a leakage area permitting escape of fluid from interiorly of the line, said pipe sections defining bores of substantially equal diameter on each side of said joint, a repair construction isolating said leakage area in said joint from the fluid flowing through said pipe line and through said bores of said rigid pipe sections, said repair construction comprising a flexible annular sleeve having a maximum diameter substantially the same as the diameter of said bores and having a plurality of superposed pleats intermediate its ends and overlying said leakage area with said ends extending beyond the leakage area and a ring of adhesive enclosing each end and securing said ends to the walls of said bores of substantially equal diameter of said adjacent pipe sections adjacent said leakage area, whereby said sleeve is adapted to undergo axial expansion and contraction upon relative movement of said rigid pipe sections, and a rigid bridging element different from said flexible sleeve and extending across the gap between the rigid pipe sections and disposed between said pipe sections and said sleeve and thereby separating said gap from said sleeve.

References Cited in the file of this patent

UNITED STATES PATENTS

| | | |
|---|---|---|
| 197,245 | Callahan | Nov. 20, 1877 |
| 1,847,676 | Sherrerd et al. | Mar. 1, 1932 |
| 2,014,313 | Damsel | Sept. 10, 1935 |
| 2,315,552 | Skeen | Apr. 6, 1943 |
| 2,784,989 | Krupp | Mar. 12, 1957 |
| 2,862,729 | Bredtschneider | Dec. 2, 1958 |
| 2,865,403 | Le Vantine | Dec. 23, 1958 |
| 2,977,994 | Xenis | Apr. 4, 1961 |

FOREIGN PATENTS

| | | |
|---|---|---|
| 686,387 | Great Britain | Jan. 21, 1953 |